July 22, 1969     B. MANINI     3,456,540
TRANSVERSE INTERRUPTED SLITTING APPARATUS FOR CONTINUOUSLY
MOVING PLASTIC FILM Filed Sept. 29, 1964

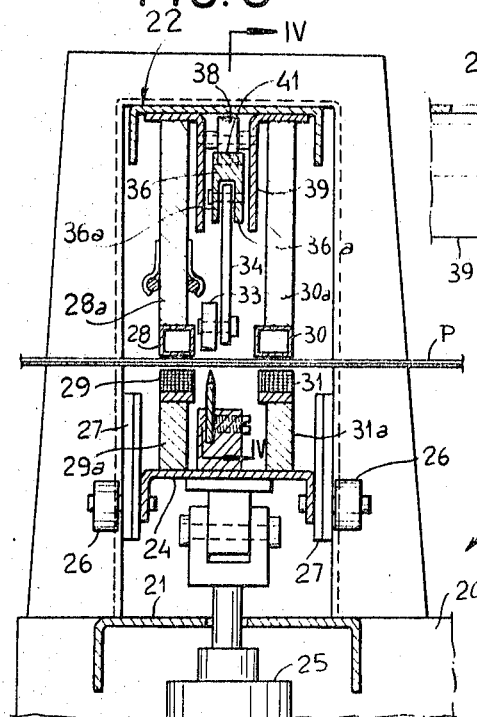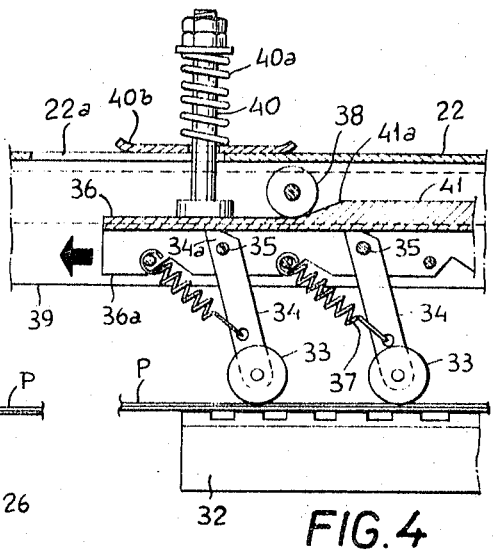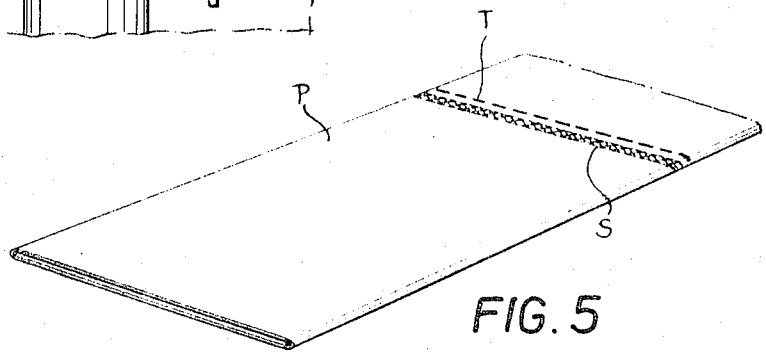

United States Patent Office 3,456,540
Patented July 22, 1969

3,456,540
TRANSVERSE INTERRUPTED SLITTING APPARATUS FOR CONTINUOUSLY MOVING PLASTIC FILM
Benito Manini, Campagnatico, Grosseto, Italy
Filed Sept. 29, 1964, Ser. No. 400,171
Claims priority, application Italy, Oct. 1, 1963, 20,107/63
Int. Cl. B23d 25/04
U.S. Cl. 83—319        4 Claims

ABSTRACT OF THE DISCLOSURE

A device for forming a transversely aligned series of slits in a continuously moving plastic film, such as a flattened tubular film for the formation of a continuous length of severable plastic bags. The device comprises a notched blade for forming the slits and a welding device for closing the adjacent end of the next bag. During slitting, the portion of the bag material which is being slit is held under tension between the welding or sealing device and a similar device which is idle and which is located downstream of the operative sealing device. The slitting and sealing devices move downstream with the continuously moving web during the slitting and sealing operations and return upstream to a fixed starting position after each operation with the slitting and sealing devices in idle positions which clear the moving web.

---

The slitting apparatus, according to the invention, substantially includes—in order to co-operate effectively with a blade having a discontinuous or notched cutting edge— as cutting pressure applying means, a series of spring pressed roller elements arranged simultaneously to press and roll along web longitudinally of the blade in such a manner as to obtain a progressive penetration of the individual cutting edges into the web of plastic film interposed under longitudinal tension between the blade and the roller elements.

A transversely extending series of roller elements is advantageously provided, with their rotational axes parallel to each other and perpendicular longitudinal axis of the blade, said roller elements being displaced transversely of the well (longitudinally of the blade) and resiliently pressing the web against the cutting edge of the blade.

In accordance with the invention, the sitting and welding apparatus is mounted on reversible carriage which moves downstream from a fixed starting position at the same speed as the continuously moving web. During this downstream movement, the slitting and welding operations are performed. From a fixed downstream limiting position, at which the cutting and welding operations been completed, the carirage is returned in an idle condition to the starting position before the web has advanced through the distance successive transverse slitting and welding operations.

A transversely extending series of spring-pressed rollers is provided for yieldingly pressing the web against the blade. The series of rollers is moved toward the blade for cutting and away from the blade for the idle return to the starting position of the carriage. Because a uniformly spaced series of rollers is provided, the slitting operation may be effected by displacement of the rollers simultaneously through a distance which is only slightly greater than the spacing between the rotational axes of adjacent rollers.

In order to maintain the portion of the web which is being slit under tension during the slitting operation, two gripping devices are provided which extend parallel to the blade at opposite sides thereof; either or both of said gripping devices may also be arranged for welding the flattened tubular web to form the closed end of a bag.

If the device is used for slitting a single layer web, the welding feature may be omitted and two non-welding gripping devices may be provided.

The invention is described in greater detail in the following specification with reference to the accompanying drawing forming a part hereof.

Figure 1:
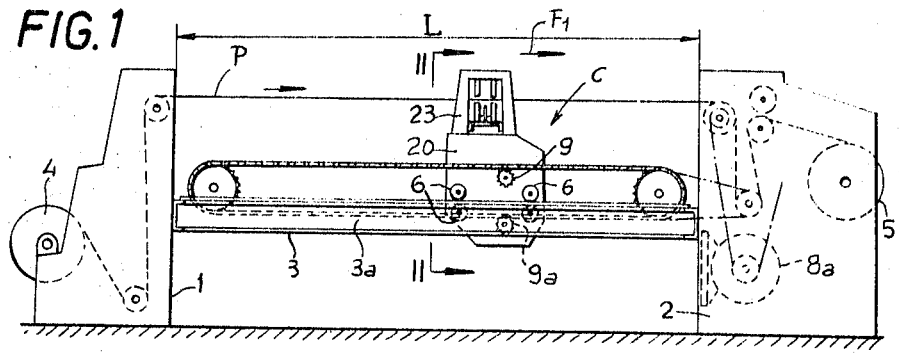
Figure 2:
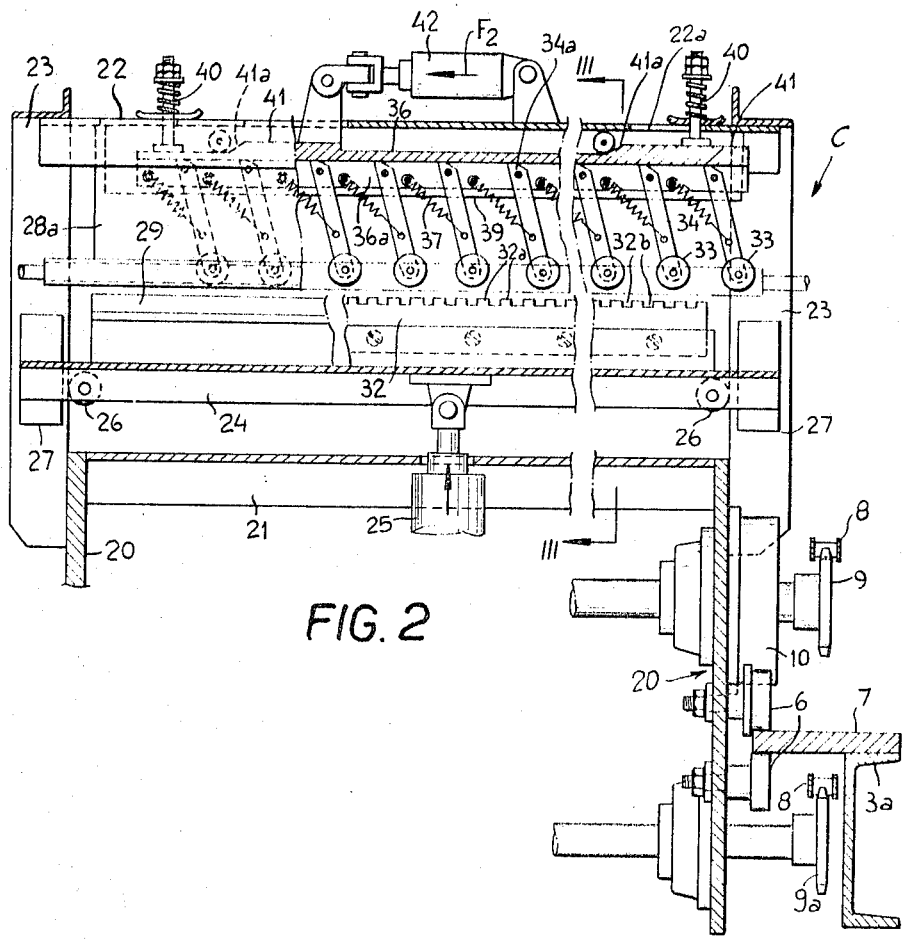

Referring to the drawing:
FIGURE 1 is a diagrammatic side elevational view of a bag forming machine embodying the invention.
FIGURE 2 is an enlarged transverse sectional view of a portion of the machine shown in FIG. 1, the view being taken looking longitudinally of the web and along the line II—II of FIG. 1, looking downstream in the direction of the arrows.
FIGURE 3 is a sectional view in side elevation taken along the line III—III of FIG. 2.
FIGURE 4 is a view in section taken transversely of the web and along the line IV—IV of FIG. 3, looking in the direction of the arrows.
FIGURE 5 is a fragmentary perspective view of a finished web, after passage through the machine of FIG. 1, the finished web consisting of a series of separable plastic bags interconnected by unsevered segments of plastic film along lines defined between the ends of adjacent aligned slits, the sealed closed bottom of each bag being adjacent to the line of slits associated with the next bag.

In the accompanying drawings, C indicates generally a longitudinally slidable carriage bearing the welding and shearing members, according to the present invention, for a sack or bag-making machine. The machine comprises input and output end frames 1 and 2, respectively.

Said frames are spaced and connected with each other by a frame 3 forming also the sliding guides or ways for the carriage C.

The film F is unwound from a drum 4 assembled on the frame 1, and said film, after the running of suitable transmission rollers and after the passage through the working zone L (restricted by the two heads of the frames 1 and 2) is introduced into the collecting cylinder 5 assembled on the rear frame 2. In the zone L, the carriage C has the possibility of alternately sliding in the two directions to effect the working operations of the present invention on the film F. During this sliding, the carriage C is laterally guided by pairs of rollers 6 operating on the plates 7; said plates are borne by the sections 3a forming the longitudinal sides of the frame 3. Two chains 8, one for each side, are actuated by the meter 8a with a speed equal to that of the material in transit, to impart the carriage a reciprocal or alternate motion in the two directions, the carriage for this purpose being provided with two sets of geared pinions 9 and 9a which engage the same chain, the first on the upper branch moved in the direction of the arrow F and the second on the lower branch. The shafts of said pinions, however idle, are alternately locked by suitable braking means 10 operable by suitable limit switches in such a manner that the carriage C, on which said braking means are mounted, is entrained in one direction or in the other direction according to the fact that the restrained or braked pinions are the upper or lower ones. Through the above stated arrangement the carriage C, during the stroke in the direction of the arrow $F_1$ for the welding and cutting operation, accompanies the tubular film material F so as to avoid the reciprocal sliding for the time required by the operation, while after said operation has been effected the carriage may return towards the frame 1, for the braking reversal between the two sets of pinions 9, 9a and thus to effect another operation in the desired point or position.

This arrangement, hinted in a demonstrative manner to illustrate a type of machine, is the object of another patent of the same applicant.

The carriage C is formed by two lateral plates 20 each bearing the pairs of rollers 6 and the shafts for the geared pinions 9, 9a cooperating with the chains 8. Said plates are connected to each other by cross beams 21, an upper bridge 22 on which the stationary welding and shearing members are applied, is borne by two lateral stirrups 23 integral to the plates 20. Under the bridge 22 a cross beam 24 is slidably mounted in the vertical direction operated by a cylinder 25 and laterally guided by pairs of rollers 26 and by slippers 27, both said guide means operate along the flanks of the sections forming the stirrups 23. Other members, hereinafter described, are arranged on said cross beam 24 and they cooperate with those borne by the upper bridge 22, forming the apparatus for the welding and cutting of the sacks or bags. The film P to be welded and to be engraved with the device according to the invention passes between the members of the bridge 22 and the members of the cross beam 24.

A welding element 28 suitably made up of a tubular shape for its cooling is arranged mounted on the support 28a for the welding S of the sacks or bags (see FIG. 5); said element cooperates with a lower contrasting element 29 borne by means of the support 29a of the cross beam 24, to effect the welding when the cross beam 24 is raised by the associated cylinder 25, the welding taking place moreover by resistance heating. Simultaneously, with the elements 30 and 31, respectively, carried through the supports 30a and 31a, by the bridge 22 and by the cross beam 24 (elements similar to those denoted by 28, 29 but without the welding functions) the film P is furthermore engaged with respect to the carriage so that there will be no mutual or reciprocal slipping. Moreover, the film remains stretched between the pincers formed by the members 28, 29 and 30, 31. Through the raising of the cross beam 24, the blade 32 contacts the film P without, however, cutting it as the contrast is upperly lacking. The blade 32 is suitably profiled as zig-zag with cutting zones 32a interposed with flattened zones 32b, so that the cutting T is discontinuous not to interrupt the continuity of the film. In order to cooperate with the blade 32 and to effect the incisions in the film P, provisions are made for a certain number of small rollers 33, each of which is applied on the end of a corresponding lever 34 linked in 35 within a longitudinal groove 36a of a slidable element 36. The levers 34 are kept in the position shown in FIG. 2, that is with the upper ends 34a suitably shaped abutting against the bottom of the groove 36a by the springs 37 and the slidable element 36 is kept adherent against the sliding rollers 38 carried by sections 39 applied under the front 22; two or more resilient stems 40 integral to the element 36 and capable of sliding in the horizontal direction within the slots 22a may serve for this purpose; springs 40a re-act between the slippers 40b and upper heads of the stems to raise the unit 36, 34, 33.

The slidable element 36, upperly in correspondence of each bearing 38, is provided with an invitation slope 41a and an adjacent track 41. A cylinder-piston 42 horizontally assembled on the bridge 28 acts in the direction of the arrow F₂ to move, at the desired moment (and actuated by an eventual lateral contact), the slidable element 36 for a certain length and in the same direction of the arrow F₂. Therefore, the lowering of the slidable element 36 is determined when the slopes 41a contact the bearings 38, thus bringing the small rollers 33 into contact with a resilient pressure onto the film P, which is already in contrast with the blade 32, the small rollers 33, besides pressing, also roll several times over the film P and thus provide for the incision or engraving in T.

Once occurred the cutting, and when the piston 42 is no longer under pressure, the slidable element 36 returns into the starting position under the action of any resilient means. The cross beam unit 24 is lowered and the film P is advanced.

What I claim is:

1. A device of the class described, comprising: an elongated frame; web delivery means at one end of said frame; web takeup means at the other end of said frame; carriage means movable longitudinally of said frame between an upstream position and a downstream position, said upstream and downstream positions being located between said delivery and takeup means with said upstream position nearer to said delivery means than said downstream position; drive means acting simultaneously on said delivery means and said takeup means for moving said web continuously and under tension at uniform velocity downstream from said upstream position to said downstream position; first controllable means connecting said carriage means to said drive means for downstream movement with said web from said upstream position to said downstream position at said uniform velocity, said controllable means, after said carriage means has reached said downstream position, returning said carriage means to said upstream position; knife means carried by said carriage means comprising a notched blade having aligned cutting edges engageable with one surface of said web; an element transversely slidable on said carriage means; second controllable drive means operable with said first controllable means to control said element in a reciprocating movement; a plurality of movable supports on said transversely slidable element; roller means on each of said movable supports; resilient means selectively urging said supports so as to make each of said roller means engageable with the other surface of said web for pressing said web into engagement with said cutting edges; gripping means carried by said carriage means and actuable to grip longitudinally spaced transversely extending portions of said web upstream and downstream of said cutting edges for maintaining the portion of said web intermediate said gripped portions under said tension; and third actuating means for causing gripping of said web by said gripping means and for causing the pressure engagement of said roller means during said downstream movement and for causing release of said web during said return movement and for maintaining said surfaces of said web free from said cutting edges and for maintaining said roller means against said cutting edges during said return movement.

2. A device according to claim 1, wherein each of said supports is a small lever linked at one end to the transversely slidable element and carrying at the free opposite end a corresponding roller means.

3. A device to determine a series of transversal aligned cuts in an elongated plastic web, comprising: a frame; knife means on the frame transversal to the web and including a notched blade having aligned cutting edges adapted to engage with a surface of said web; a transversely slidable element on the frame; first drive means to move said element with an alternating movement; a plurality of movable supports on said transversely slidable element; roller means on each of said movable supports; resilient means selectively urging said supports so as to make each of said roller means engageable with the other surface of said web to press said web into engagement with said cutting edges; gripping means actuable to grip longitudinally spaced transversely extending portions of said web upstream and downstream of said cutting edges for maintaining the portion of said web intermediate said gripped portions under said pressure; and second actuating means for causing gripping of said web by said gripping means and for causing the pressure engagement of said roller means against said cutting edges, and then for causing the release of said web and for maintaining the said surfaces of said web free from said cutting edges and said roller means.

4. A device for forming a transversely aligned series of slits in a plastic film to effect separation of the sacks made up from a tubular strip, said device including an elongated blade having a discontinuous cutting edge; roller elements rollable along the blade and adapted to press the blade so as to determine the progressive penetration of the cutting edge into the plastic film interposed and stretched between the blade and the roller elements, the axes of said rollers being mutually parallel and orthogonal to the blade cutting edges, said roller elements being slid along the blade while being resiliently pressed on the blade; a unit capable of being moved in the direction of the blade on which the film to be worked upon is stretched; arms on the unit linked to each other, each arm having a roller at the free end thereof resiliently stressed to separate from the unit and move toward the blade; and actuating means movable toward the blade and unit for moving said unit simultaneously with the slitting of the film.

References Cited
UNITED STATES PATENTS

| | | | |
|---|---|---|---|
| 1,624,367 | 4/1927 | Scheffey | 83—318 |
| 1,801,337 | 4/1931 | Elsaesser | 83—320 |
| 1,945,063 | 1/1934 | Moone | 83—320 |
| 3,140,218 | 7/1964 | Hannon | 156—583 |
| 3,234,072 | 2/1966 | Dreeben | 156—583 |
| 3,138,985 | 6/1964 | Mills | 156—510 |

DOUGLAS J. DRUMMOND, Primary Examiner

U.S. Cl. X.R.

83—320, 512, 695; 156—513